United States Patent
Leskes

(10) Patent No.: US 11,586,374 B2
(45) Date of Patent: *Feb. 21, 2023

(54) INDEX LIFECYCLE MANAGEMENT

(71) Applicant: Elasticsearch B.V., Mountain View, CA (US)

(72) Inventor: Boaz Leskes, Amsterdam (NL)

(73) Assignee: Elasticsearch B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/505,382

(22) Filed: Oct. 19, 2021

(65) Prior Publication Data

US 2022/0035555 A1 Feb. 3, 2022

Related U.S. Application Data

(63) Continuation of application No. 16/402,050, filed on May 2, 2019, now Pat. No. 11,182,093.

(51) Int. Cl.
*G06F 16/30* (2019.01)
*G06F 3/06* (2006.01)
(Continued)

(52) U.S. Cl.
CPC ............ *G06F 3/0649* (2013.01); *G06F 3/067* (2013.01); *G06F 3/0614* (2013.01); *G06F 16/22* (2019.01); *G06F 16/2358* (2019.01)

(58) Field of Classification Search
CPC .............................. G06F 16/22; G06F 16/2358
(Continued)

(56) References Cited

U.S. PATENT DOCUMENTS 6,519,597 B1 2/2003 Cheng et al.
7,945,533 B2 5/2011 Krishnaprasad et al.
(Continued)

FOREIGN PATENT DOCUMENTS

CN 106528797 A 3/2017
CN 106934062 A 7/2017
(Continued)

OTHER PUBLICATIONS

"International Search Report" and "Written Opinion of the international Searching Authority," Patent Cooperation Treaty Application No. PCT/US2019/063437, dated Feb. 7, 2020, 8 pages.
(Continued)

*Primary Examiner* — Sana A Al-Hashemi
(74) *Attorney, Agent, or Firm* — Quinn IP Law

(57) ABSTRACT

Methods and systems for index lifecycle management are provided. Exemplary methods include: receiving an ILM policy; determining a first condition and a first action for a first phase using the ILM policy; performing the first action for the first phase when the first condition is met; transition from the first phase to a second phase; determining a second condition and a second action for the second phase using the ILM policy; performing the second action for the second phase when the second condition is met; transition from the second phase to a third phase; determining a third condition and a third action for the third phase using the ILM policy; performing the third action for the third phase when the third condition is met; transition from the third phase to a fourth phase; and deleting the index during the third phase.

20 Claims, 8 Drawing Sheets

(51) Int. Cl.
*G06F 16/23* (2019.01)
*G06F 16/22* (2019.01)

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 8,352,519 B2* | 1/2013 | Nath | G11C 11/5621 |
| | | | 707/812 |
| 8,615,794 B1 | 12/2013 | Tomilson et al. | |
| 8,898,261 B1 | 11/2014 | Patsenker et al. | |
| 8,930,332 B2 | 1/2015 | Burstein | |
| 9,015,301 B2* | 4/2015 | Redlich | G06F 21/6254 |
| | | | 707/777 |
| 9,734,180 B1 | 8/2017 | Graham et al. | |
| 10,541,983 B1 | 1/2020 | Khashei Varnamkhasti et al. | |
| 10,891,165 B2 | 1/2021 | Willnauer | |
| 10,997,204 B2 | 5/2021 | Leskes | |
| 11,182,093 B2 | 11/2021 | Leskes | |
| 11,188,531 B2 | 11/2021 | Leau | |
| 2005/0004892 A1 | 1/2005 | Brundage et al. | |
| 2005/0114397 A1 | 5/2005 | Doshi et al. | |
| 2006/0075079 A1 | 4/2006 | Powers et al. | |
| 2007/0130236 A1* | 6/2007 | Seeger | G06Q 40/12 |
| 2009/0276215 A1 | 11/2009 | Hager | |
| 2011/0134764 A1 | 6/2011 | Venkatapadmanaabhan | |
| 2011/0282839 A1 | 11/2011 | Paksoy et al. | |
| 2012/0233118 A1 | 9/2012 | Holt et al. | |
| 2012/0233299 A1 | 9/2012 | Attanasio et al. | |
| 2013/0086039 A1 | 4/2013 | Saleh et al. | |
| 2013/0297469 A1 | 11/2013 | Spittle et al. | |
| 2014/0012814 A1 | 1/2014 | Bercovici et al. | |
| 2014/0157224 A1* | 6/2014 | Capuozzo | H04W 4/60 |
| | | | 717/100 |
| 2014/0279871 A1 | 9/2014 | Ochoa et al. | |
| 2014/0330785 A1 | 11/2014 | Isherwood et al. | |
| 2015/0280999 A1 | 10/2015 | Chart et al. | |
| 2015/0293955 A1 | 10/2015 | Dickey | |
| 2015/0379083 A1 | 12/2015 | Lang et al. | |
| 2016/0085839 A1 | 3/2016 | D'Halluin et al. | |
| 2016/0191509 A1 | 6/2016 | Bestler et al. | |
| 2016/0203168 A1 | 7/2016 | Gangadharappa | |
| 2016/0203174 A1 | 7/2016 | Shahane et al. | |
| 2016/0224600 A1* | 8/2016 | Munk | G06Q 20/08 |
| 2016/0292171 A1 | 10/2016 | Bhagat et al. | |
| 2017/0024453 A1 | 1/2017 | Raja et al. | |
| 2017/0124151 A1 | 5/2017 | Ji et al. | |
| 2017/0193041 A1 | 7/2017 | Fuchs | |
| 2017/0371926 A1 | 12/2017 | Shiran et al. | |
| 2018/0189328 A1 | 7/2018 | Frazier et al. | |
| 2018/0268000 A1 | 9/2018 | McManus et al. | |
| 2019/0026336 A1 | 1/2019 | Tian | |
| 2019/0266271 A1 | 8/2019 | Leau | |
| 2020/0050612 A1 | 2/2020 | Bhattacharjee et al. | |
| 2020/0084213 A1 | 3/2020 | Taropa | |
| 2020/0133550 A1 | 4/2020 | Wilinauer | |
| 2020/0176098 A1 | 6/2020 | Lucas et al. | |
| 2020/0201879 A1 | 6/2020 | Leskes | |
| 2020/0233692 A1 | 7/2020 | Kandula | |
| 2020/0326986 A1 | 10/2020 | Wilinauer | |
| 2020/0328936 A1 | 10/2020 | Pérez-Aradros Herce et al. | |
| 2020/0348878 A1 | 11/2020 | Leskes | |
| 2021/0124620 A1 | 4/2021 | Wilinauer | |
| 2021/0126977 A1 | 4/2021 | Ruflin et al. | |
| 2021/0015263 A1 | 5/2021 | Ruflin et al. | |
| 2021/0240731 A1 | 8/2021 | Leskes | |
| 2022/0050844 A1 | 2/2022 | Leau | |
| 2022/0075646 A1 | 3/2022 | Landau et al. | |

FOREIGN PATENT DOCUMENTS

| | | |
|---|---|---|
| EP | 3899710 A1 | 10/2021 |
| GB | 2592130 A | 8/2021 |
| WO | WO2020131330 A1 | 6/2020 |

OTHER PUBLICATIONS

Tedor, Jason, "Introduce Cross-Cluster Replication": GitHub [online], Sep. 5, 2017 [retrieved Jan. 24, 2020], retrieved from the internet: <https://github.com/elastic/elasticsearch/issues/30086>, 9 pages.

Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.

Bradford, Ronald, "SQL, ANSI Standards, PostgreSQL and MySQL", Retrieved from the Internet: <URL http://ronaldbradford.com/blog/sql-ansi-standards-postgresql-and-mysql-2015-03-26/, Mar. 26, 2015 [retrieved on Jun. 4, 2021], 33 pages.

"can I use elasticsearch-sql to convert sql to DSL?", GitHub, Retrieved from the Internet: <URL https://glthub.com/NLPchina/elasticsearch-sql/issues/156>, Feb. 2016 [retrieved on Jul. 29, 2020], 4 pages.

Andhavarapu, Abhishek, "Beginners guide to querying Elasticsearch (Scoring vs Sorting)", Retrieved from the internet: <URL https://abhishek376.wordpress.com/2017/07/06/begginers-guide-to-querying-elasticsearch/, Jul. 6, 2017 [retrieved on Jun. 4, 2021], 10 pages.

"Extended European Search Report", European Patent Application No. 21165715.0, dated Dec. 10, 2020, 7 pages.

"Office Action", British Patent Application No. GB 2104443.3, dated Aug. 16, 2021, 9 pages.

"Office Action", British Patent Application No. GB2105205.5, dated Oct. 4, 2021, 11 pages.

"Extended European Search Report", European Application No. 21167941.0, dated Sep. 6, 2021, 10 pages.

Willnauer, Simon Daniel, "Shard Splitting," U.S. Appl. No. 16/176,956, filed Oct. 31, 2018, Specification, Claims, Abstract, and Drawings, 47 pages.

Willnauer, Simon Daniel, "Frozen indices," U.S. Appl. No. 16/383,562, filed Apr. 12, 2019, Specification, Claims, Abstract, and Drawings, 50 pages.

Leskes, Boaz, "Cross Cluster Replication," U.S. Appl. No. 16/229,847, filed Dec. 21, 2018, Specification, Claims, Abstract, and Drawings, 53 pages.

* cited by examiner

```
510 ⤳ PUT _ilm/policy/datastream_policy
         {
520 ⤳      "policy": {
              "phases": {
530 ⤳            "hot": {
                    "actions": {
540 ⤳                  "rollover": {
                          "max_size": "50GB",
                          "max_age": "30d"
                       }
                    }
                 },
                 "delete": {
550 ⤳              "min_age": "90d",
                    "actions": {
560 ⤳                  "delete": {}
                    }
                 }
              }
           }
         }
```

PUT _template/datastream_template
      {
570 ~~  "index_patterns": ["datastream-*"],
        "settings": {
          "number_of_shards": 1,
          "number_of_replicas": 1,
580 ~~    "index.lifecycle.name": "datastream_policy",
590 ~~    "index.lifecycle.rollover_alias": "datastream"
        }
      }
```

FIG. 5B

… # INDEX LIFECYCLE MANAGEMENT

CROSS-REFERENCE TO RELATED APPLICATIONS

This application is a Continuation of and claims the priority benefit of U.S. patent application Ser. No. 16/402,050 filed on May 2, 2019, entitled "Index Lifecycle Management," the disclosure of which is incorporated herein by reference in its entirety for all purposes.

TECHNICAL FIELD

The present technology pertains to organized collections of information and more specifically to resource management for organized collections of information.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data communications networks can be used for a distributed application structure that divides tasks between the providers of a resource or service, called servers, and service requesters, called clients. A server host runs one or more server programs, which share their resources with clients. A client does not necessarily share any of its resources, but requests a server's content or service function. Clients initiate communication sessions with servers which await incoming requests.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various methods and systems for index lifecycle management. Specifically, a method for index lifecycle management may comprise: receiving an Index Lifecycle Management (ILM) policy; determining a first condition and a first action for a first phase using the ILM policy; performing the first action for the first phase when the first condition is met; transition from the first phase to a second phase; determining a second condition and a second action for the second phase using the ILM policy; performing the second action for the second phase when the second condition is met; transition from the second phase to a third phase; determining a third condition and a third action for the third phase using the ILM policy; performing the third action for the third phase when the third condition is met; transition from the third phase to a fourth phase; and deleting the index during the third phase.

BRIEF DESCRIPTION OF THE DRAWINGS

Embodiments are illustrated by way of example, and not by limitation, in the figures of the accompanying drawings, in which like references indicate similar elements and in which:

FIG. 5A shows an example index lifecycle management policy, according to some embodiments.

FIG. 5B depicts an example template for applying an index lifecycle management policy to an index, according to various embodiments.

DETAILED DESCRIPTION

Figure 1:
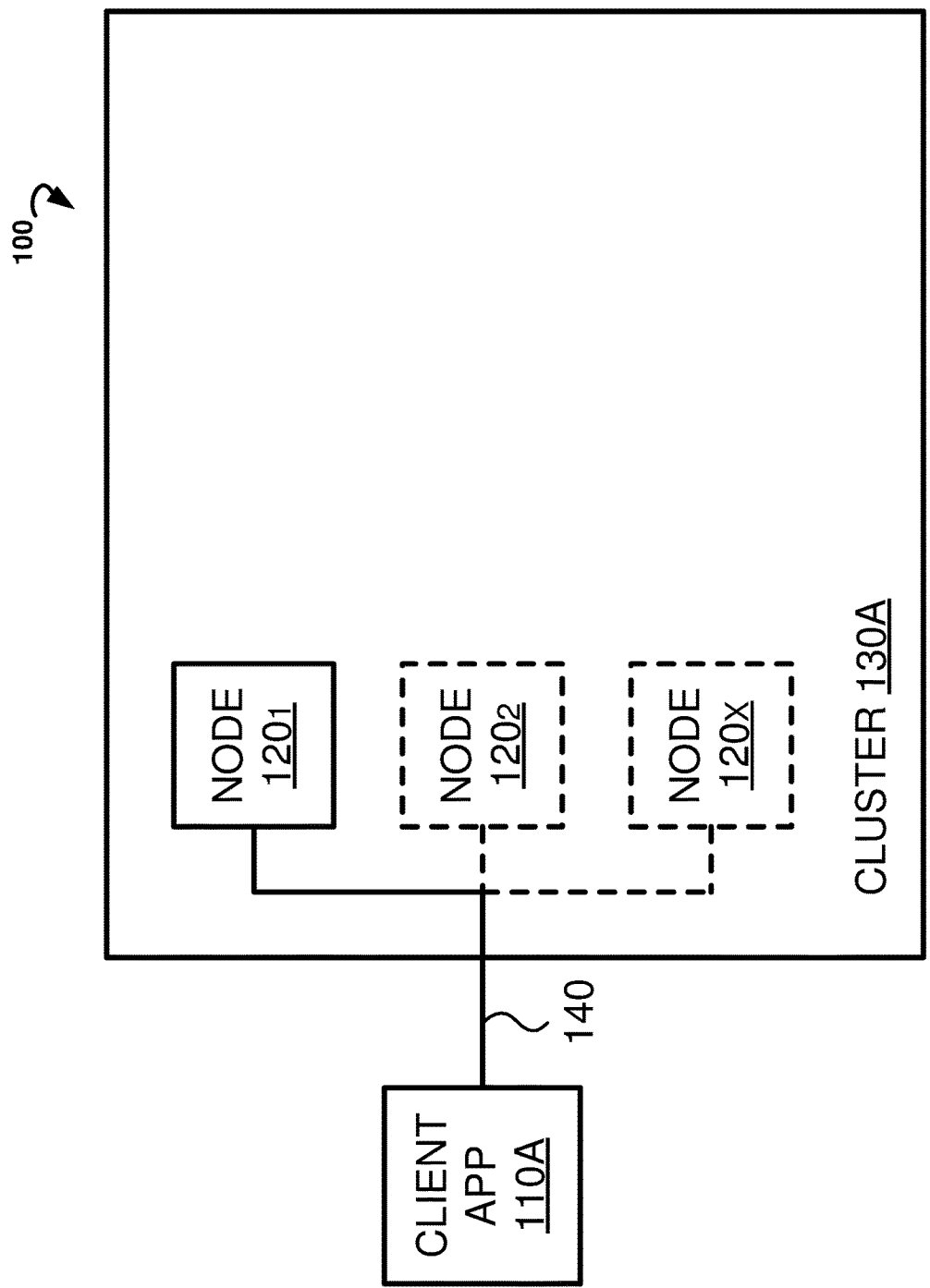
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows system 100 having a distributed application structure, according to some embodiments. System 100 includes client application 110A, one or more nodes $120_1$-$120_x$, and connections 140. Collectively, one or more nodes $120_1$-$120_x$ form cluster 130A. When only one node (e.g., node $120_1$) is running, then cluster 130A is just one node.

In various embodiments, a cluster (e.g., cluster 130A) is a collection of one or more nodes (servers) (e.g., one or more nodes $120_1$-$120_x$) that together store data and provides federated indexing and search capabilities across all nodes. A cluster can be identified by a unique name, such that a node can be part of a cluster when the node is set up to join the cluster by its name. A cluster may have only one node in it.

In some embodiments, a node (e.g., one or more nodes $120_1$-$120_x$) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster.

An index (not depicted in FIG. 1) is a collection of documents that have somewhat similar characteristics, according to various embodiments. For example, you can have an index for customer data, another index for a product catalog, and yet another index for order data. An index is identified by a name and this name is used to refer to the index when performing indexing, search, update, and delete operations against the documents in the index. A document (not depicted in FIG. 1) is a basic unit of information that can be indexed, according to some embodiments. For example, you can have a document for a single customer, another document for a single product, and yet another for a single order. An index can potentially store a large amount of data that can exceed the hardware limits of a single node. For example, a single index of a billion documents taking up 1 TB of disk space may not fit on the disk of a single node or may be too slow to serve search requests from a single node alone. An index can be subdivided into multiple pieces called shards. Subdividing an index into shards can be referred to as "sharding." Each shard can be a fully-functional and independent "index" that can be hosted on any node (e.g., one or more nodes $120_1$-$120_x$) in the cluster. For example, sharding can offer the benefits of horizontally splitting/scaling content, and distributing and parallelizing operations across shards (and potentially multiple nodes) to increase performance/throughput.

In some embodiments, at least one application programming interface (API) can be used to communicate with a cluster (e.g., cluster 130A). An API can include a set of subroutine definitions and protocols. For example, a node client and/or a transport client can be used be used to communicate with nodes (e.g., one or more nodes $120_1$-$120_x$) in a cluster. A node client joins a local cluster as a non-data node, which doesn't hold any data itself, but knows what data lives on which node in the cluster, and can forward requests directly to the correct node. The transport client can be used to send requests to a remote cluster. It doesn't join the cluster itself, but simply forwards requests to a node in the cluster. Other APIs, such as the RESTful API, can be used. Various languages (e.g., Groovy, JavaScript, .NET, PHP, Perl, Python, Ruby, and the like) can be used to communicate with a cluster using the RESTful API In some embodiments, nodes (e.g., one or more nodes $120_1$-$120_x$) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 11A) requests to the appropriate node. Each node can serve one or more purposes, master node and data node.

A master node can perform such cluster-wide actions as creating and/or deleting an index, tracking which nodes (e.g., one or more nodes $120_1$-$120_x$) are part of the cluster (e.g., cluster 130A), and deciding which shards to allocate to which nodes. Data nodes can hold shards that contain documents that have been indexed. Data nodes can handle data related operations such as create, read, update, and delete (operations that are used to administer persistent data storage; also referred to as CRUD), search, and aggregations. Ingest nodes can apply an ingest pipeline (e.g., a definition of a series of processors) to a document in order to transform and enrich the document before indexing. A tribe node can connect to multiple clusters and perform search and other operations across all connected clusters.

Each of client application 110A and one or more nodes $120_1$-$120_x$ can be a physical computing system, virtual machine, container, and the like. Generally, client application 110A can run on the same or different physical computing system, virtual machine, container, and the like as each of one or more nodes $120_1$-$120_x$. Each of one or more nodes $120_1$-$120_x$ can run on the same or different physical computing system, virtual machine, container, and the like as the others of one or more nodes $120_1$-$120_x$. A physical computing system is described further in relation to the exemplary computer system 700 of FIG. 7.

In some embodiments, virtual machines provide a substitute for a physical computing system and the functionality needed to execute entire operating systems. Virtual machines are created and run by a hypervisor which uses native execution to share and manage hardware, allowing for multiple environments which are isolated from one another, yet can exist on the same physical computing system.

In various embodiments, containers are an operating system-level virtualization method for deploying and running distributed applications without launching an entire virtual machine for each application. Containers can look like real computers from the point of view of programs running in them. Generally, a computer program running on an operating system can see all resources (e.g., connected devices, files and folders, network shares, CPU power, etc.) of that computer. However, programs running inside a container can only see the container's contents and devices assigned to the container. Containers can be arranged, coordinated, and managed by container orchestration (e.g., Kubernetes, Amazon Elastic Container Service, Docker Swarm, and the like). In contrast to hypervisor-based virtualization, containers may be an abstraction performed at the operating system (OS) level, whereas virtual machines are an abstraction of physical hardware.

When client application 110A runs on a different physical server from a node (e.g., of one or more nodes $120_1$-$120_x$), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes $120_1$-$120_x$) runs on a different physical computing system from another node (of one or more nodes $120_1$-$120_x$), connections 140 can be a data communications network.

Figure 2:
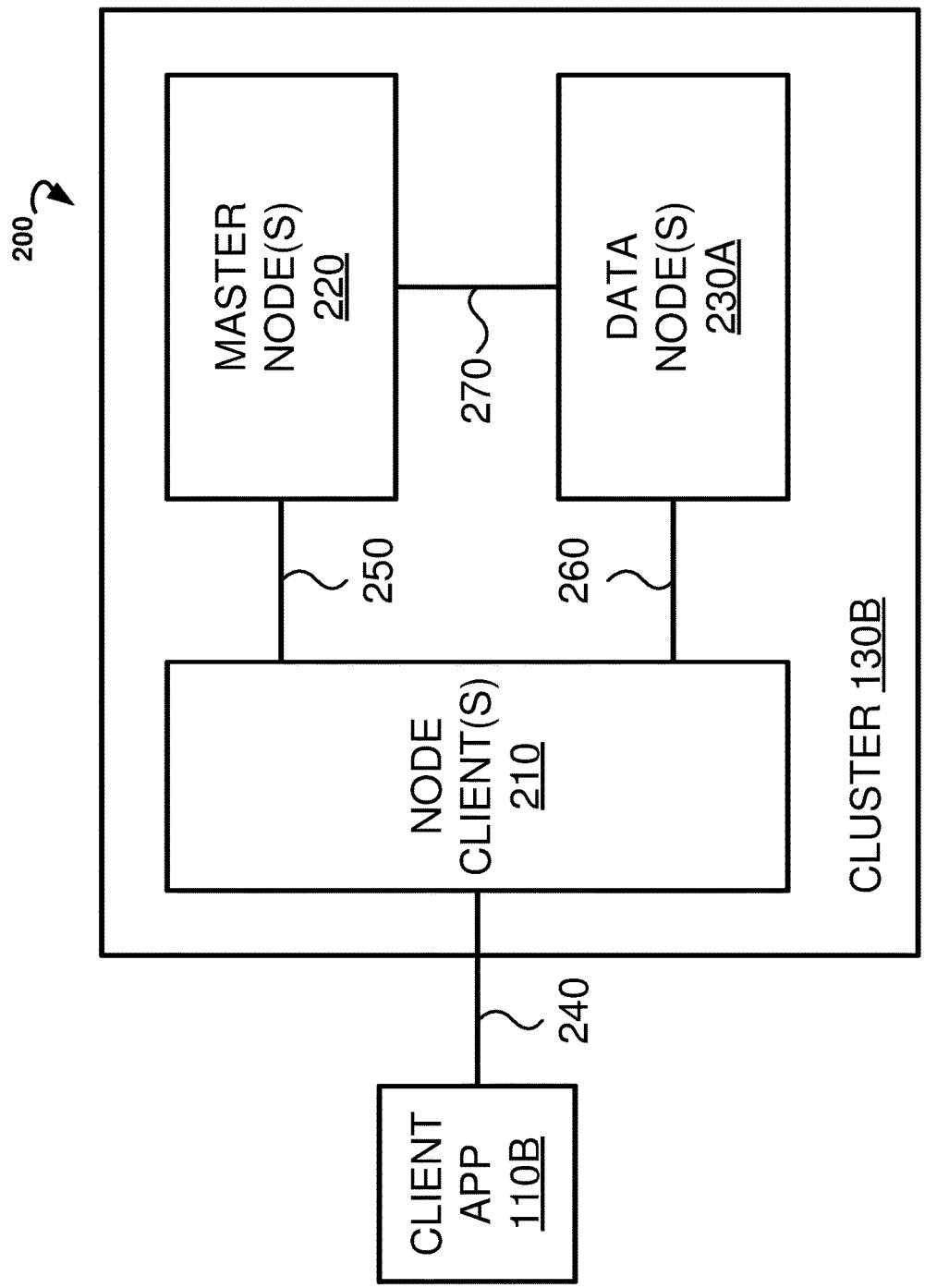
FIG. 2 is a simplified block diagram with a detailed view of a cluster, according to various embodiments.

FIG. 2 shows system 200 having a distributed application structure, according to some embodiments. System 200 can include client application 110B and cluster 130B. Client application 110B and cluster 130B can communicate with each other using communications network 240. Communications network 240 can include various combinations and permutations of wired and wireless networks such as the Internet, local area networks (LAN), metropolitan area networks (MAN), wide area networks (WAN), and the like using Ethernet, Wi-Fi, cellular networks, and the like. Client application 110E and cluster 130B can each have at least some of the characteristics described above in relation to client application 110A and cluster 130A (including one or more nodes $120_1$-$120_x$) in FIG. 1, respectively. Cluster 130B can include node client(s) 210, master node(s) 220, and data node(s) 230A. Node clients, master nodes, and data nodes were described above in relation to FIG. 1.

According to some embodiments, the distributed application is a distributed, multitenant-capable full-text search engine, such as Elasticsearch. Elasticsearch is designed to store, retrieve, and manage document-oriented or semi-structured data. As described above, an index is a collection of documents that can have somewhat similar characteristics and a document is a basic unit of information that can be indexed. An index can potentially store a large amount of data that can exceed the hardware limits of a single node (e.g., data node(s) 230A and one or more nodes $120_1$-$120_x$ (FIG. 1)).

In various embodiments, connections 240-270 can each include the same or different data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). For example, client application 110B can send an indexing and/or search request to node client(s) 210, and receive an indexing and/or search response from node client(s) 210 via connections 240. By way of further non-limiting example, node client(s) 210 can coordinate cluster state and metadata with master node(s) 220 via connections 250. By way of additional non-limiting example, node client(s) 210 can forward indexing and/or search requests to data node(s) 230A, and receive an indexing and/or search response from data node(s) 230A via connections 260. By way of further non-limiting example, master node(s) 220 can coordinate cluster state and metadata with data node(s) 230A via connections 270.

Figure 3:
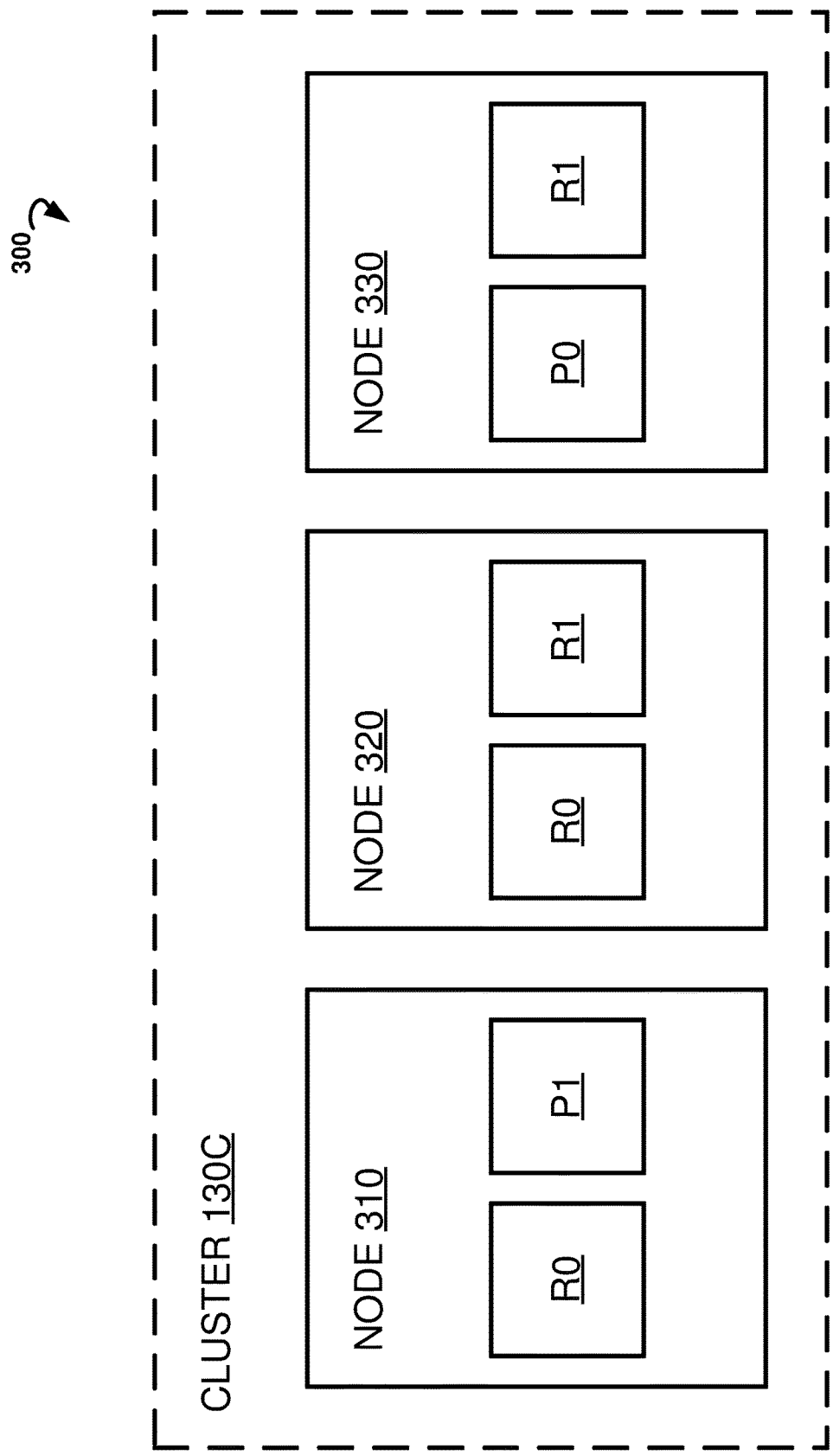
FIG. 3 is a simplified block diagram with a detailed view of data nodes, in accordance with some embodiments.

FIG. 3 illustrates a cluster 130C according to some embodiments. By way of non-limiting example, the cluster 103C can include data node 310, data node 320, and data node 330. The cluster 103C can comprise more or fewer data nodes. Data node 310, and data node 320, and data node 330 can have at least some of the characteristics of one or more nodes $120_1$-$120_x$ (FIG. 1) and data nodes 230A (FIG. 2).

According to some embodiments, the distributed application is a distributed, multitenant-capable full-text search engine, such as Elasticsearch. Elasticsearch is a document-oriented database designed to store, retrieve, and manage document-oriented or semi-structured data. As described above, an index is a collection of documents that can have somewhat similar characteristics and a document is a basic unit of information that can be indexed. An index can potentially store a large amount of data that can exceed the hardware limits of a single node (e.g., data node(s) 230B, data nodes 230A (FIG. 2), and one or more nodes $120_1$-$120_x$ (FIG. 1)).

As described above, an index can be subdivided into multiple pieces called shards. Shards can be both a physical and logical division of an index. According to some embodiments, a shard includes a Lucene index. Each Lucene index can be divided into smaller files called segments. A segment is a small Lucene index. Lucene is an information retrieval software library which implements indexing, analyzing, and searching.

When an index is created, the number of shards can be specified. Each shard can in itself be a fully-functional and independent "index" that can be hosted on any node (e.g., data node(s) 230B, data nodes 230A (FIG. 2), and one or more nodes $120_1$-$120_x$ (FIG. 1)) in the cluster (e.g., cluster 130A (FIG. 1) and cluster 130B).

Figure 4:
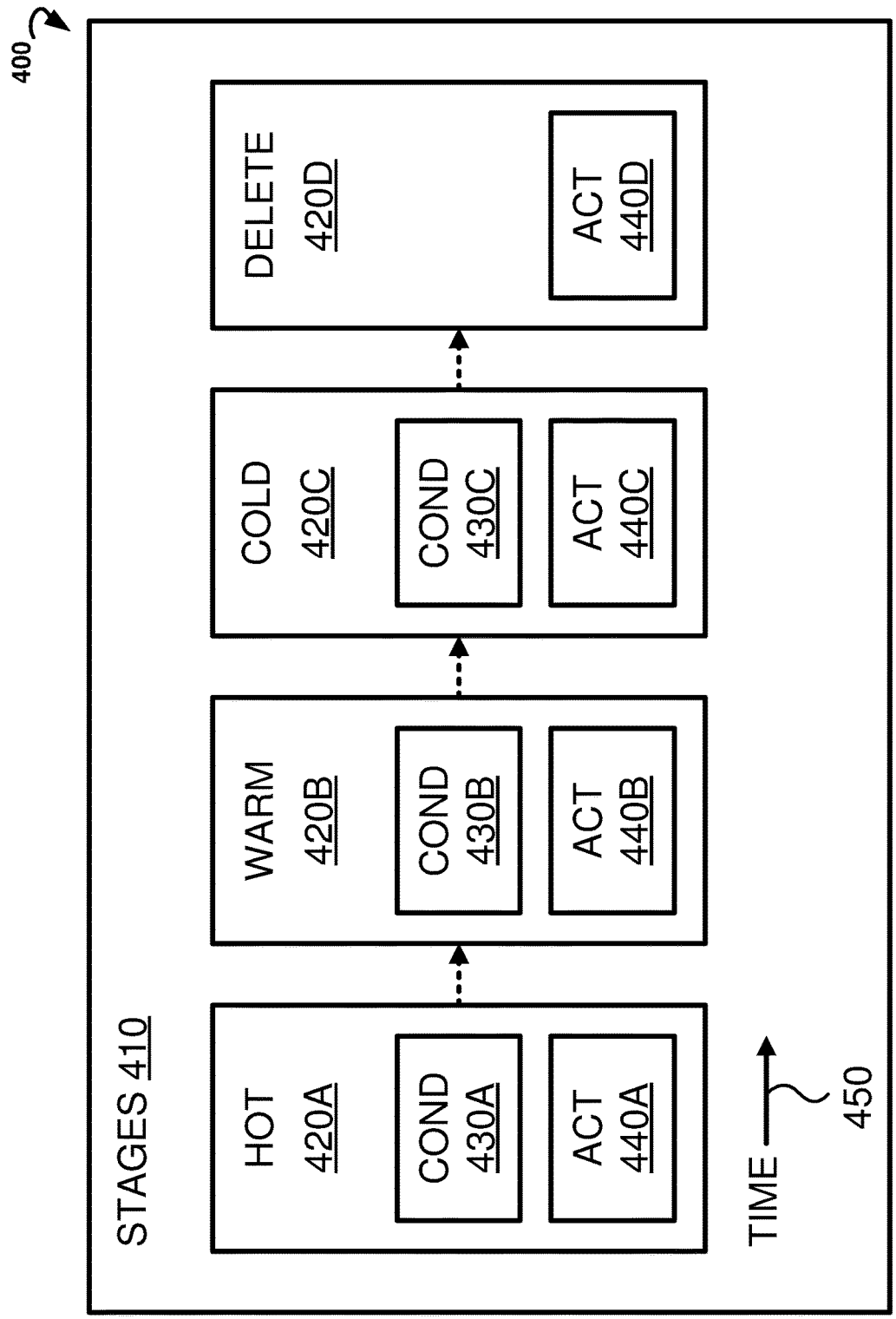
FIG. 4 is a simplified block diagram depicting an index lifecycle, in accordance with various embodiments.

FIG. 4 illustrates index lifecycle 400, according to some embodiments. Index lifecycle management (ILM) is described herein in relation to time-based data and time-based indices, purely for the purpose of illustration and not limitation. Indices and their constituent shards, such as described above in relation to FIG. 3), can include time-based data and hence be referred to as time-based indices. Typically, search engines, such as Elasticsearch, involve a relatively static collection of documents that grows slowly. Searches look for the most relevant documents, regardless of when they were created. In contrast, the number of documents in time-based indices (arising from time-based data streams) grows rapidly, often accelerating with time. Moreover, documents in time-based indices are almost never updated, and searches mostly target the most recent documents. As documents in time-based indices age, they lose value. By way of example, time-based data streams can come from logging, social-network activity, and the like.

If one big index were used to store time-based data, the one big index could quickly exceed the practical and physical storage of a node or even nodes. Logging events just keep on coming, without pause or interruption. Old events could be deleted, but this approach is very inefficient. When you delete a document, it is only marked as deleted and not physically deleted, until a separate operation which can be referred to as a force merge is performed.

Instead, an index per time frame can be created, resulting in a time-series of indices. Time frames can be a year, month, week, day, hour, and the like, depending on how much data is received. Similarly, when each index per time frame (or each index of time series indices) is created, the number of (primary) shards can be selected based on how much data is received. To purge old data, old indices can be deleted.

In homogeneous clusters, where all the nodes in the cluster are the same, it generally does not matter on which nodes the indices (and their constituent shards) reside. In heterogeneous clusters, where the nodes can have varying amounts of resources, such as processing (CPU) power and mass storage capacity and/or speed, indices can be placed in nodes where the resources of each node (and its constituent shards) can be efficiently use based on demand.

Index lifecycle 400 can include stages (or phases) 410, such as hot 420A, warm 420B, cold 420C, and delete 420D. Stages 410 can also be referred to as phases. Lifecycle 400 can use more or fewer of stages 410 than are shown in FIG. 4. In hot 420A, for example, the index is actively being updated (e.g., receives new data) and queried (e.g., searched). In warm 420B, for example, the index is no longer being updated, but is still being queried. In cold 420C, for example, the index is no longer being updated and is seldom queried (e.g., once per hour, once per day, once per week, once per month, and the like depending on the use case); the information still needs to be searchable, but it's okay if those queries are slower. In delete 420D, for example, the index is no longer needed and can safely be deleted. Delete 420D can be subject to an organization's data retention policy, which specifies when (e.g., after a prescribed amount of time has elapsed) data can be safely deleted.

By way of non-limiting example, as an index ages (e.g., as time 450 elapses) and progresses (sequentially) through stages (or phases) 410, it can be moved through a progression of less powerful (and hence less expensive) nodes. For example, at hot 420A, an index can be in a powerful node(s) (e.g., having a powerful CPU(s) and high-performance mass storage, such as a solid-state drive(s) (SSD(s))) and have multiple primary shards for indexing. At warm 420B, the index can be still be in a powerful node(s) (e.g., having a powerful CPU(s) and high-performance mass storage) or less-powerful nodes (than at hot 212) and have fewer primary shards optimized for searching. At cold 420C, the index can be in a weak node (e.g., having a slower CPU(s) and lower-performance mass storage, such as a hard disk drive(s) (HDD(s))) and have one primary shard. In this way, a different number of primary shards can be used when actively indexing than when just running searches.

At each of stages (or phases) 410, actions (or operations) 440A-440D can be taken when conditions (or criteria) 430A-430C are satisfied. In some embodiments, some of stages 410 can be effectively empty (e.g., to skip a stage, a user configures a stage not to have any conditions and actions, including default conditions and actions). For example, the hot 420A and warm 420B can have at least one condition and action, but cold 420C and delete 420D do not have any conditions and actions. Such empty phases can be skipped. When there is a next stage—having at least one condition and action—which comes after an empty phase, the next stage can be applied instead of the empty phase.

In various embodiments, at least two stages (of stages 410) can each include at least one condition and at least one action. For example, each of conditions 430A-430C can include one or more distinct conditions. By way of further example, actions 440A-440D can each include one or more distinct actions. For example, conditions 430A-430C and actions 440A-440D can include: the maximum size or age at which you want to roll over to a new index; the point at which the index is no longer being updated and the number of primary shards can be reduced; when to force a merge to permanently delete documents marked for deletion; the point at which the index can be moved to less performant hardware; the point at which the availability is not as critical and the number of replicas can be reduced; when the index can be safely deleted; and the like.

Non-limiting examples of conditions 430A-430C include: time elapsed (e.g., after years, months, weeks, days, hours, etc.) and size (e.g., of an index in kilobytes (KB), megabytes (MB), gigabytes (GB), terabytes (TB), etc.). Non-limiting examples of actions 440A-440D include: set priority, rollover, unfollow, allocate, read-only, force merge, shrink, freeze, and delete. Set priority action sets the index priority on an. Indices with a higher priority will be recovered before indices with lower priorities following a node restart. Generally, indexes in the hot 420A should have the highest value and indexes in cold 420C should have the lowest values.

The rollover action rolls an alias over to a new index when the existing index meets one of the rollover conditions. In some embodiments, an index name is accepted when working against a specific index, and several indices when applicable. When an alias name is used for an index name, the alias name is converted to the actual index name. An alias can also be mapped to more than one index, and when specifying it, the alias will automatically expand to the aliased indices. An alias can also be associated with a filter that will automatically be applied when searching, and routing values. Generally, an alias cannot have the exact same name as an index. For a rollover action, a default (e.g., when none is specified in a policy) time condition can be 30 days and a default size condition can be 50 GB.

The allocate action specifies which nodes are allowed to host the shards of the index and set the number of replica shards (e.g., as described above in relation to FIG. 3). The read-only action sets the index to be read-only (e.g., writing to the index is not permitted). The force merge action force merges the index into at most a specific number of (Lucene) segments. The delete action deletes the index (e.g., removes it from main memory, mass storage, etc.).

The freeze action freezes the index. Open (e.g., not frozen) indices maintain data structures in main memory to allow them to be searched efficiently and to index into them. The amount of main memory required for these data structures can add up to a significant amount. For indices that are searched frequently it is better to keep these structures in memory, because it takes time to rebuild them. Indices that are searched infrequently can be frozen, where the data structures are not maintained in main memory. Instead, the data structures are rebuilt for each search. Frozen indices are described further in U.S. patent application Ser. No. 16/383,562 filed Apr. 12, 2019, titled "Frozen Indices," which is hereby incorporated by reference for disclosure of frozen indices.

The shrink action shrinks the index into a new index with fewer primary shards. After shrinking an index, for example, the resulting index is compacted and optimized for efficient searches. Shrinking an index includes making a copy (referred to herein as copy index) of the original index (referred to herein as original index) and deleting original index once copy index is ready. Original index should be searched until it is deleted and then copy index should be searched. For searches that specifically search original index (e.g., the full file name of original index is specified), aliasing can be used. When original index is deleted, an alias directing searches to copy index can be created. Shard resizing, such as shrinking and expanding, is described further in U.S. patent application Ser. No. 16/176,956 filed Oct. 31, 2018, titled "Shard Splitting," which is hereby incorporated by reference for disclosure of shard resizing.

For searches of time-based data, multiple indices of time-series indices can be searched. Typically, names of time-series indices (referred to as index names) comprise a common base or root (e.g., "monitoring-") and a unique (time-series) identifier (e.g., "2019-01-01," "2019-02-01," "2019-03-01," and so on), to produce index names such as "monitoring-2019-01-01," "monitoring-2019-02-01," "monitoring-2019-03-01," and so on. Searches of time-series indices can use the common base and capture the unique (time-series) identifier using a wildcard. A wildcard is a character (e.g., "*") that will match any character or sequence of characters in a search. Here, a search could specify "monitoring-*" and index files "monitoring-2019-01-01," "monitoring-2019-02-01," "monitoring-2019-03-01," and so on are searched.

To prevent copy index from being caught up in such a search, a prefix (e.g., "copy-") can be added to the beginning of the index names of original index to produce an index name for copy index. So, an index name for copy index when original index has an index name of "monitoring-2019-01-01" would be "copy-monitoring-2019-01-01." Once copy index is ready, an alias directing searches to copy index can be created.

The unfollow action converts a follower index into a regular index. Follower indices are used in cross-cluster replication (CCR), which is copying a local cluster to a follower cluster. CCR can be useful, for example, for: disaster recovery in case a primary cluster fails where a secondary cluster can serve as a hot backup; geo-proximity so that reads can be served locally; and the like. CCR is described further in U.S. patent application Ser. No. 16/229,847 filed Dec. 21, 2018, titled "Cross Cluster Replication," which is hereby incorporated by reference for disclosure of CCR.

Indices involved in CCR require particular handling. For example, the index on a leader cluster is monitored for conditions 430A-430C, and not the index (copy) on a follower cluster. Other complications for ILM can arise during CCR. In CCR, the follower cluster copies operations (performs the same operations as) the leader cluster, operation by operation. However, the follower cluster can still be in the process of performing past operations of the leader cluster (e.g., catching up to the leader cluster) and the leader cluster can be ready to delete original index, such as when performing the shrink action under ILM. In other words, leader cluster can delete original index before follower cluster is has finished with it.

In addition, while the leader cluster and the follower cluster have the same number of primary shards, during CCR the index on the leader cluster could shrink before the index on the follower cluster is ready. A shrink operation merges multiple primary shards on the leader cluster, which creates sequence number duplicates. The sequence number duplicates overlap and are not unique, so the follower cluster does not have a way to catch up to the leader cluster, confusing CCR. For at least these reasons, the shrunk index on the leader cluster cannot serve as a replacement for the original (e.g., before shrinking) index on the leader cluster.

A history retention lease can be maintained on each shard of the leader cluster and used to keep track of which operations performed on each shard of the leader cluster (e.g., tracked using the shard's sequence numbers) need to be saved for the follower cluster. Each of the leader cluster's shards would then save operations for the follower cluster according to its respective history retention lease. The follower cluster can communicate the last (successfully) completed operation(s), so the leader cluster can update the history retention lease on each shard and remove the operations on each shard that are no longer needed by the follower cluster.

Additionally or alternatively, when the leader cluster is done writing to (e.g., indexing documents in) an index, the leader cluster can put a marker on the index (or the constituent shards of the index) to indicate the leader cluster is done writing to the index. For example, when the leader cluster rolls over an index and starts writing to a new index, the leader cluster can put a marker on the index (or the constituent shards of the index) to indicate the leader cluster is done writing to the index. In various embodiments, the marker can be metadata stored in the index (or the constituent shards of the index) of the leader cluster. When the follower cluster encounters the marker, it can stop reading operations (history), because leader cluster is no longer writing to the index (e.g., indexing). The follower cluster can unfollow the index and indicate to the leader index to remove the marker.

FIG. 5A shows ILM policy 500A, in accordance with some embodiments. For example, ILM policy 500A can be in JavaScript Object Notation (JSON) and include one or a series of conditions and actions for at least one of stages (or phases) 410 in FIG. 4. JSON is an open-standard file format that uses human-readable text to transmit data objects consisting of attribute-value pairs and array data types.

Part 510 is a call to the put lifecycle API endpoint to create a new policy named "datastream_policy." Part 520 is a policy definition sub-object. Part 530 is the hot phase defined in the "phases" section. Here, the optional "min_age" field not defined and defaults to 0 ms. Part 540 is a rollover action definition. Part 550 specifies a delete phase beginning after 90 days. Part 560 is a delete action definition.

By way of further non-limiting example, an ILM policy can include: when the index reaches 50 GB, roll over to a new index; move the old index into the warm stage, mark it read only, and shrink it down to a single shard; after 7 days, move the index into the cold stage and move it to less expensive hardware; delete the index once the required 30 day retention period is reached.

FIG. 5B shows template 500B for applying an ILM policy (e.g., ILM policy 500A in FIG. 5A) to an index, in accordance with some embodiments. For example, template 500B can be in JavaScript Object Notation (JSON) and include settings to be applied when a new index is created (e.g., during a rollover operation). Part 570 indicates match all indices starting with "datastream." These will include all newly created indices from actions like rollover.

Part 580 indicates the name of the lifecycle policy managing the index. Part 580 includes setting index.lifecycle.name. This setting will configure the "datastream_policy" to the index applying this template. This means that all newly created indices prefixed "datastream-" will be managed by the ILM policy.

Part 590 is an alias to use for the rollover action. Part 590 includes setting index.lifecycle.rollover_alias. This setting is required when using a policy containing the rollover action and specifies which alias to rollover on behalf of this index. The intention here is that the rollover alias is also defined on the index.

Figure 6:
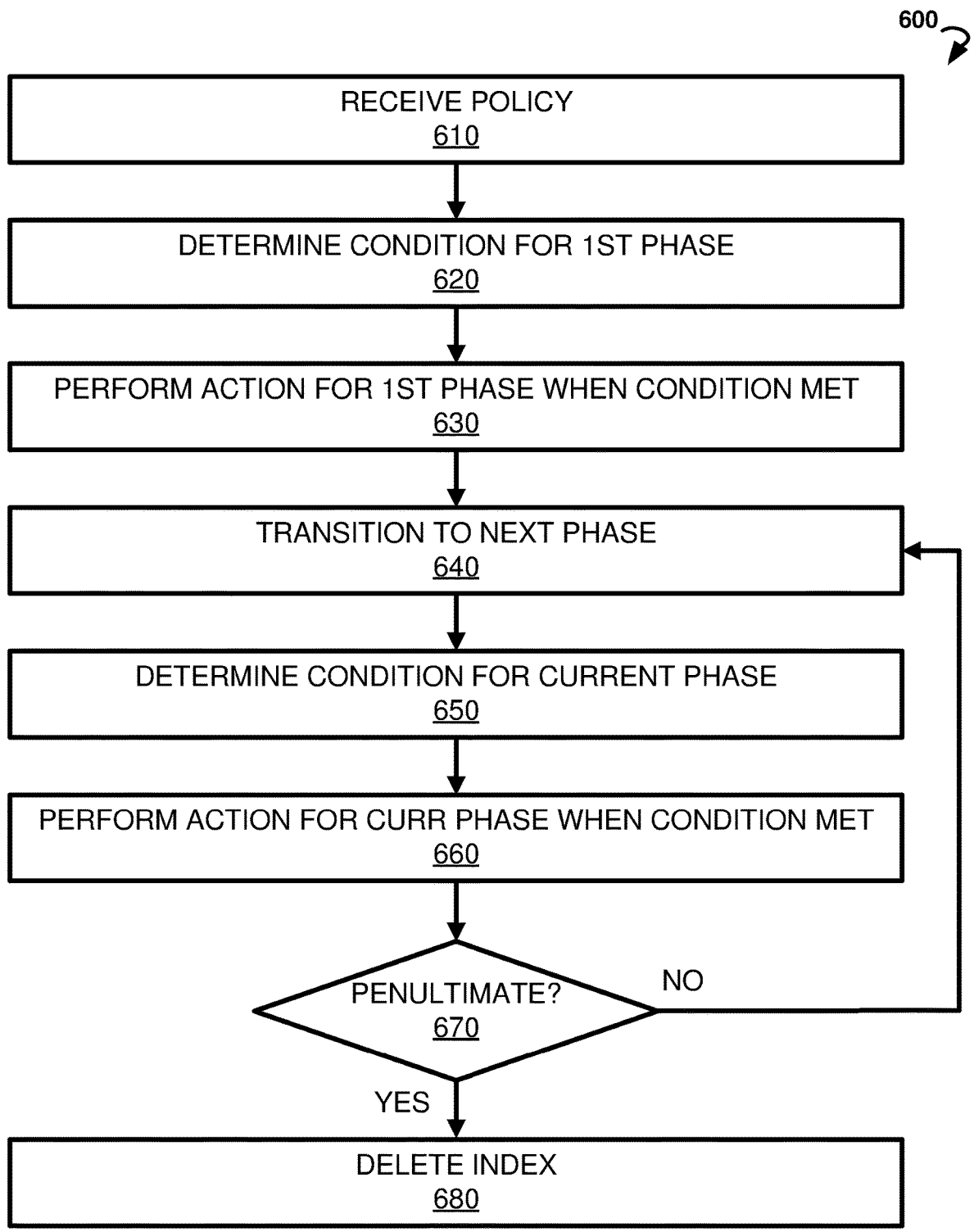
FIG. 6 is a simplified flow diagram of a method for index lifecycle management, in accordance with some embodiments.

FIG. 6 shows method 600 for managing an index lifecycle, according to some embodiments. Method 600 can be performed by a master node (FIG. 2). Generally, conditions (e.g., conditions 430A-430B in FIG. 4) can be determined by the master node (alone) or in coordination with a data node (FIG. 2). For example, a master node can determine when an index is seven days old. Should the master node fail, when the master node starts up again (or a new master nodes takes its place), the (new) master node can check when the index was created and determine if the specified amount of time has elapsed to satisfy a condition. By way of further example, the master node must coordinate with a data node to determine whether an index has reached a particular size. Should the master node fail, there is no harm (e.g., no data is corrupted) in checking with the data node again when the master node comes back up or is replaced by another master node.

Similarly, operations (e.g., actions 440A-440B) can be performed by the master node (alone) or in coordination with a data node (FIG. 2). When a master node fails without committing the change of its last operation, the master node rolls back and starts at the previous checkpoint (e.g., the last operation that was committed and published to all master nodes). When a master node fails while a data node is processing its last operation, upon restart (or replacement) the (new) master node has no way of knowing which actions were already in flight. Some possible operations can corrupt data when executed twice. Accordingly, ILM may only allow operations (e.g., actions 440A-440D in FIG. 4) that are safe to retry (e.g., executed more than once). For example, a force merge can be to one file or a set of single files. A force merge can be dispatched to a node and it will perform the force merge. Another force merge can be dispatched to the same node and when the data is already stored in one file or a single set of files, the node can determine that further action is not necessary. If you do this multiple times in succession, data corruption will not result.

Generally, a user requesting an operation (e.g., actions 440A-440D) is authorized when the request is made. Authorization is the process of determining whether the user behind an incoming request is allowed to execute it. This process typically takes place once a request is successfully authenticated and the user behind the request is identified. A role has a unique name and identifies a set of permissions that translate to privileges on resources, such as indices/ aliases, documents, fields, users, the Elasticsearch cluster itself, and the like. A user can be associated with an arbitrary number of roles. The total set of permissions that a user has is therefore defined by union of the permissions in all its roles.

Since an ILM policy (e.g., ILM policy 500A in FIG. 5A) can function over a long period of time (e.g., 30 days or more), the user who created the ILM policy may no longer have the permission to perform the operations in the ILM policy or may no longer exist. A security subsystem can authenticate which role the user has and store the authenticated role in the ILM policy. When the ILM policy is being executed, the master node (FIG. 2) enforces the security policy by checking whether the authenticated role (that the user had when the policy was created) has sufficient privilege for the operations in the ILM policy. The policy and roles for the policy do not change, unless another user changes the ILM policy. Then the policy will have the roles of the user that made the changes.

Method 600 can commence at step 610 where an index lifecycle management (ILM) policy for an index can be received. ILM was described above in relation to FIG. 4 and example ILM policies were presented above in relation to FIG. 5A. Also at step 610, the ILM policy can be associated with (applied to) the index. Once the ILM policy is associated with the index, a per index state (e.g., which stage of stages 410 in FIG. 4 the index is in) can be maintained. An example template for applying an ILM policy to an index was presented above in relation to FIG. 5B.

At step 620, a condition (or conditions) for a first phase can be determined. The condition for the first phase, for example, can be determined from the ILM policy and/or can be conditions 430A (FIG. 4). When conditions are not explicitly included in an ILM policy, default conditions can be used. In various embodiments, the first phase is hot 420A (FIG. 4). At step 630, the action (or actions) to be performed on the index in the first phase can be executed. For example, actions to be performed in the first phase can be determined from the ILM policy and include: set priority, rollover, and unfollow.

At step 640, a transition to a next phase can be made. Once the transition to the next phase is made at step 640, the next phase is referred to as the current phase at step 640. For example, following step 630, the next phase is the phase which follows the first phase. By way of further non-limiting example, following step 670, the next phase is the phase which follows the current phase.

At step 650, a condition (or conditions) for a current phase can be determined. The condition for the current phase, for example, can be determined from the ILM policy and/or can be conditions 430B and/or 430C (FIG. 4). When conditions are not explicitly included in the ILM policy, default conditions can be used. In various embodiments, the current phase is (sequentially) warm 420B and/or cold 420C (FIG. 4). At step 660, the action (or actions) to be performed on the index in the current phase can be determined from the ILM policy and executed. For example, actions to be performed when the current phase is warm 420B can include: set priority, allocate, read-only, force merge, shrink, and unfollow. By way of further non-limiting example, actions to be performed when the current phase is cold 420C can include: set priority, allocate, freeze, and unfollow.

At step 670, whether the current phase is the penultimate (e.g., second to the last) phase can be determined. When the current phase is the penultimate phase, method 600 proceeds to step 680. When the current phase is not the penultimate phase, method 600 proceeds to step 640. At step 680, the index can be deleted.

Figure 7:
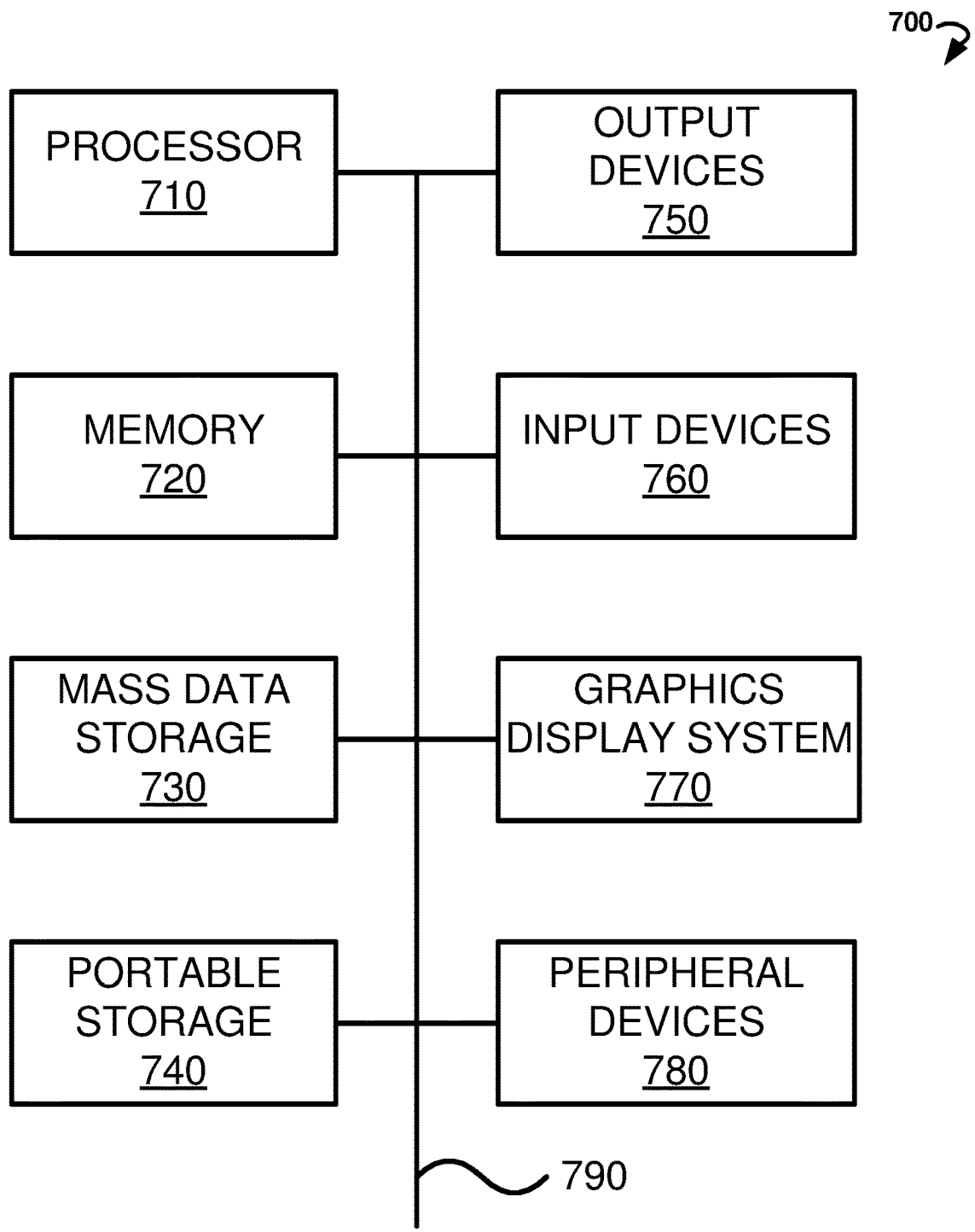
FIG. 7 is a simplified block diagram of a computing system, in accordance with various embodiments.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

Some of the components provided in the computer system 700 in FIG. 7 can be those typically found in computer systems that may be suitable for use with embodiments of the present disclosure and are intended to represent a broad category of such computer components. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM).

Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for integrated lifecycle management (ILM), the method comprising:
    receiving an ILM policy for an index;
    determining a first condition and a first action for a first phase using the ILM policy;
    performing the first action for the first phase when the first condition is met;
    successively transitioning the index from the first phase to one or more further phases;
    at each of the one or more further phases, determining a further condition and a further action for one of the one or more further phases using the ILM policy;
    performing the further action for the one of the one or more further phases when the further condition is met;
    transitioning the index from the one of the one or more further phases to a last phase; and
    deleting the index during the last phase.

2. The computer-implemented method of claim 1, wherein the first condition and the further condition are at least one of: when the index exceeds a particular age, and when the index exceeds a particular size.

3. The computer-implemented method of claim 2, wherein a default age is 30 days and a default size is 50 GB.

4. The computer-implemented method of claim 2, wherein the first action includes at least one of: set priority, rollover, and unfollow.

5. The computer-implemented method of claim 4, wherein the one or more further phases include a second phase and a third phase, wherein the further action includes a second action associated with the second phase and a third action associated with the third phase, wherein:
    the second action includes at least one of: set priority, allocate, read-only, force merge, shrink, and unfollow; and
    the third action includes at least one of: set priority, allocate, freeze, and unfollow.

6. The computer-implemented method of claim 5, wherein the ILM policy is in JavaScript Object Notation.

7. The computer-implemented method of claim 5, wherein:
    in the first phase the index is being updated and is searched;
    in the second phase the index is no longer being updated and is searched; and
    in the third phase the index is no longer being updated and is seldom queried.

8. The computer-implemented method of claim 5, wherein:
    the further action for the third phase is a shrink action;
    the shrink action creates a copy index from the index; and
    an index name of the copy index includes a predetermined prefix added to a front of an index name of the index.

9. The computer-implemented method of claim 1, wherein:
    the index is in a leader cluster being replicated in a follower cluster using cross-cluster replication; and
    shards of the index in the leader cluster include a history retention lease, the history retention lease denoting operations to be saved for the follower cluster to execute.

10. The computer-implemented method of claim 9, wherein shards of the index in the leader cluster include a marker when the index in the leader cluster is rolled over.

11. A system for integrated lifecycle management (ILM), the system comprising:
    a processor configured to:
        receive an ILM policy for an index;
        determine a first condition and a first action for a first phase using the ILM policy;
        perform the first action for the first phase when the first condition is met;
        successively transition the index from the first phase to one or more further phases;
        at each of the one or more further phases, determine a further condition and a further action for one of the one or more further phases using the ILM policy;
        perform the further action for the one of the one or more further phases when the further condition is met;
        transition the index from the one of the one or more further phases to a last phase; and
        delete the index during the last phase; and
    a memory communicatively coupled to the processor, the memory storing instructions executable by the processor.

12. The system of claim 11, wherein the condition and the further condition are at least one of: when the index exceeds a particular age, and when the index exceeds a particular size.

13. The system of claim 12, wherein a default age is 30 days and a default size is 50 GB.

14. The system of claim 12, wherein the first action includes at least one of: set priority, rollover, and unfollow.

15. The system of claim 14, wherein the one or more further phases include a second phase and a third phase, wherein the further action includes a second action associated with the second phase and a third action associated with the third phase, wherein:
   the second action includes at least one of: set priority, allocate, read-only, force merge, shrink, and unfollow; and
   the third action includes at least one of: set priority, allocate, freeze, and unfollow.

16. The system of claim 15, wherein the ILM policy is in JavaScript Object Notation.

17. The system of claim 15, wherein:
   in the first phase the index is being updated and is searched;
   in the second phase the index is no longer being updated and is searched; and
   in the third phase the index is no longer being updated and is seldom queried.

18. The system of claim 15, wherein:
   the further action for the third phase is a shrink action;
   the shrink action creates a copy index from the index; and
   an index name of the copy index includes a predetermined prefix added to a front of an index name of the index.

19. The system of claim 11, wherein:
   the index is in a leader cluster being replicated in a follower cluster using cross-cluster replication;
   shards of the index in the leader cluster include a history retention lease, the history retention lease denoting operations to be saved for the follower cluster to execute; and
   the shards of the index in the leader cluster further include a marker when the index in the leader cluster is rolled over.

20. A non-transitory computer-readable storage medium having embodied thereon instructions, which when executed by at least one processor, perform steps of a method comprising:
   receiving an ILM policy for an index;
   determining a first condition and a first action for a first phase using the ILM policy;
   performing the first action for the first phase when the first condition is met;
   successively transitioning the index from the first phase to one or more further phases;
   at each of the one or more further phases, determining a further condition and a further action for one of the one or more further phases;
   performing the further action for the one of the one or more further phases when the further condition is met;
   transitioning the index from the one of the one or more further phases to a fourth last; and
   deleting the index during the last phase.

* * * * *